June 23, 1942.   C. D. RYDER   2,287,277
METHOD OF FORMING AND INJECTING THERMOPLASTIC MATERIALS
Filed July 21, 1939
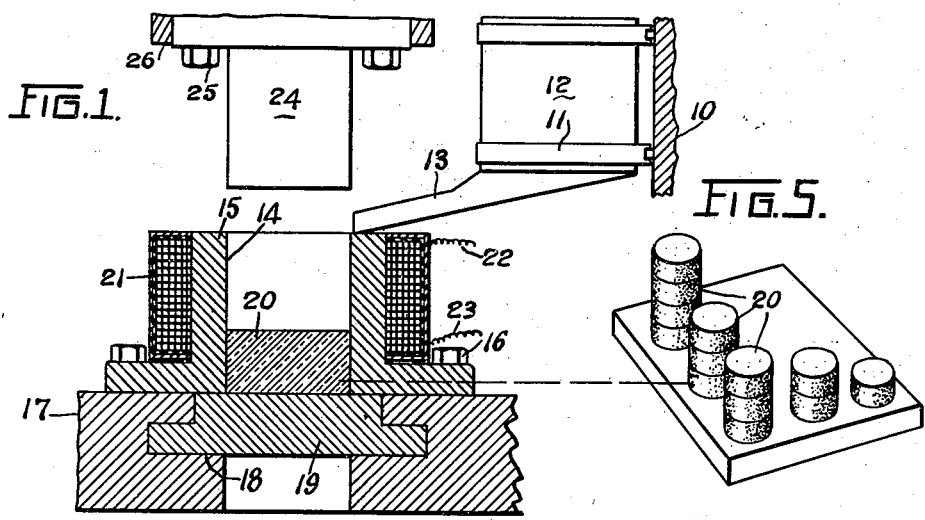
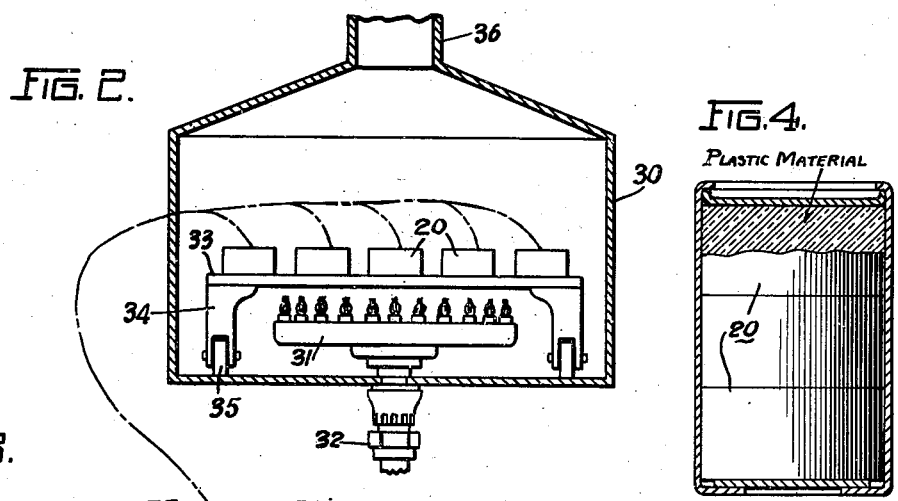
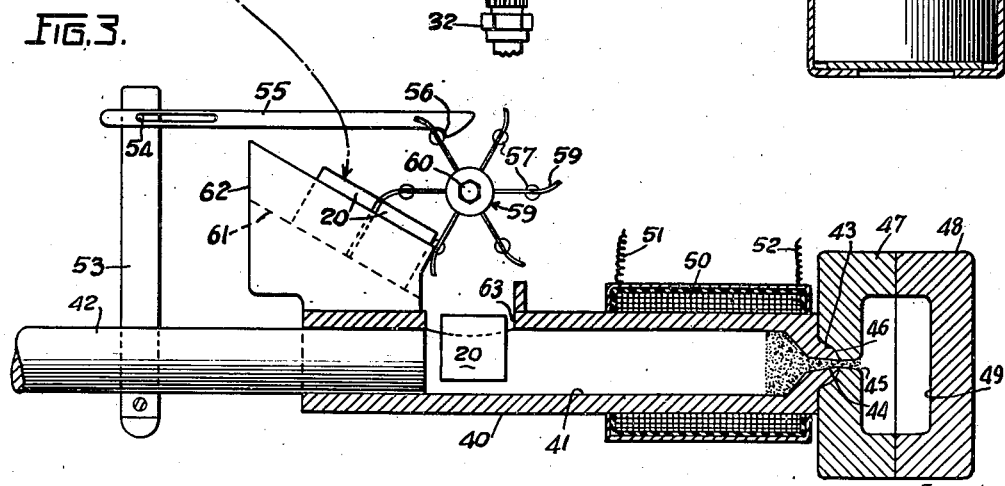
Inventor
CHARLES D. RYDER,
Attorneys Patented June 23, 1942

2,287,277

UNITED STATES PATENT OFFICE 2,287,277

METHOD OF FORMING AND INJECTING THERMOPLASTIC MATERIALS

Charles D. Ryder, Covington, Ky., assignor to The Grotelite Company, Inc., Bellevue, Ky., a corporation of Kentucky Application July 21, 1939, Serial No. 285,754

6 Claims. (Cl. 18—55)

This invention relates to plastic molding, and in particular, to method of forming and injecting thermoplastic materials.

One object of this invention is to provide a method of forming pellets of thermoplastic material from granulated material, so that the pellets occupy less space and more easily heated than the corresponding quantity of granulated molding material.

Another object is to provide a method of forming pellets of thermoplastic material consisting in inserting loosely granulated material into a mold and compressing the material to form a solid block or pellet.

Another object is to provide a method of injecting thermoplastic materials consisting in forming a pellet thereof by compressing loosely granulated material into a solid cake or block, heating these pellets or blocks to a predetermined temperature which is as high as possible without deforming them, then feeding the heated pellets into an injection molding machine, further heating the pellets in the plastic injection molding chamber, and then injecting the plastic material into a mold.

Another object is to provide a method of forming an injection molding cartridge consisting in compressing charges of loosely granulated molding material into solid compressed pellets, inserting a plurality of these pellets in a cartridge container, and securing the pellets within the container.

In the drawing:

Figure 1 is a diagrammatic elevation, partly in section, showing the forming of pellets of thermoplastic materials from loosely granulated material.

Figure 2 is an elevation, partly in section, showing the heating of the pellets.

Figure 3 is a side elevation, partly in section, showing the feeding of the previously heated pellets into the injection chamber of a plastic injection molding machine, where the pellets are further heated and then injected into the mold.

Figure 4 is a central vertical section through a plastic injection molding cartridge made according to a modification of the method of this invention.

Figure 5 is a perspective view showing a number of thermoplastic pellets formed as illustrated in Figure 1.

In general, the method of this invention consists in inserting a predetermined quantity of loosely granulated thermoplastic molding material into a suitable enclosure, such as a mold, and then subjecting the material to pressure so as to compress it into the form of a pellet. To assist in the compression, heat may be applied to the mold during the compression operation.

The pellets thus comprise solid blocks of molding material which occupy considerably less volume than the corresponding quantity of loosely granulated molding material. At the same time the period of time required for bringing the pellets up to a plastic molding temperature is considerably reduced because the solid pellet has a much higher heat transmission than the loosely granulated materials due to the absence of air spaces between the particles thereof.

The prepared pellets are then heated to a suitable preliminary temperature as high as possible without deforming them, such as causing them to swell, after which they are fed into the injection chamber of an injection molding machine, where they are further heated and then injected into the mold. As an alternative, several of the pellets are assembled into a cartridge container which is then injected in a suitable molding machine having an injection cylinder.

Referring to the drawings in detail, Figure 1 shows one embodiment of apparatus for preparing the pellets of molding material. This apparatus consists of a support 10 having brackets 11 supporting a container 12 for loosely granulated molding material. The latter is fed through a spout 13 into the cavity 14 of a mold 15 which is secured as at 16 to a bed 17 having a guideway 18 for receiving a slide 19. The latter may be withdrawn in order to facilitate removing the pellets 20 from the mold cavity 14.

The mold 15 is surrounded by a heating element 21, such as a coil of high reisistance wire, from which leads 22 and 23 are connected to a suitable source of electric current. Cooperating with the mold cavity 14 is a mold plunger 24 secured as at 25 to a platen 26. The platen 26 is movable vertically by any suitable means, such as by a crank mechanism or hydraulic cylinder, so that the plunger 24 is caused to enter the mold cavity 14 and compress the granulated molding material into a pellet 20.

The method of preparing the pellets 20 thus includes inserting the loosely granulated thermoplastic molding material into a mold cavity, compressing the material to form a solid cake, and preferably heating the materials while they are being compressed. The completed pellets may be stored for future use or they may be made up into cartridges as shown in Figure 4. Obviously the pellets may also be used immediately.

In using the pellets 20 for injection purposes, the apparatus of Figures 2 and 3 may be employed. Figure 2 shows a heating device consisting of an enclosure 30 having a heating burner 31 therein to which gas is supplied through the conduit 32. The pellets 20 being heated are supported upon a carriage 33 having legs 34 with rollers 35. The height of the flame of the burner 31 may be regulated by any suitable means, such as manually or thermostatically, so that an even heat is obtained. The pellets 20 are heated to a predetermined temperature, depending upon the particular molding material employed. This temperature is as high a temperature as possible without deforming the pellets, such as by swelling. Surplus heat is carried away by the flue 36.

When the pellets 20 have been thus heated to a preliminary temperature, they are inserted in the apparatus of Figure 3 for molding purposes. This apparatus is shown diagrammatically and consists of an injection cylinder 40 having an injection bore 41 within which an injection plunger 42 is reciprocable. The injection cylinder 40 is provided with a nozzle 43 having an orifice 44 registering with an orfice 45 and socket 46 in a mold 47. The latter forms a mold half which fits a corresponding mold leaf 48, the two having a mold cavity 49. The injection cylinder 40 is surrounded by an electrical heating unit 50 having leads 51 and 52.

The injection plunger 42 is provided with an arm 53 secured thereto and carrying a pivot 54 on which is mounted a latch arm 55. The latter is provided with a hook portion 56 which is adapted to engage pins 57 mounted on the radial arms 58 of a star wheel generally designated 59. The star wheel 59 is mounted upon a pivot shaft 60, around which it is rotatable.

The heated pellets 20 are removed from the heating chamber 30 as indicated by the dotted lines and inserted upon an inclined guideway 61 in a bracket 62 mounted on the injection cylinder 40. Each successive pellet 20 is engaged by one of the radial arms 58 of the star wheel 59 so that it is prevented from leaving the guideway 61 until the star wheel 59 rotates a predetermined amount. The injection cylinder 40 is provided with an aperture 63 through which the pellets 20 may drop when they enter the injection chamber 41.

The method of plastic injection molding with the pellets when employing the apparatus of Figures 2 and 3 consists in heating the pellets 20 to a predetermined high temperature sufficiently high to render them soft without deformation, and then placing them in the injection chamber, after which they are subjected to further heat and injected into the mold. To this end the star wheel 59 is rotated as the injection plunger 42 performs its work. The injection plunger 42 is reciprocated by any suitable driving means, such as a hydraulic cylinder. When the injection plunger 42 executes a forward or injection stroke the hook portion 56 of the latch 55 advances and drops over one of the pins 58. When the injection plunger 42 is retracted, however, the consequent retraction of the latch 55 causes the hook 56 to engage the pin 57 and rotate the star wheel 59. When this occurs one of the pellets 20 which is held in the inclined guideway 61 is released so that it drops through the aperture 63 into the injection bore 41. Here it is subjected to heat from the heating coil 50 surrounding the cylinder 40, so that the previously heated pellet 20 is now rendered sufficiently plastic for injection purposes.

The injection plunger 42 then executes an injection or forward stroke, forcing the plastic material through the orifices 44 and 45 into the mold cavity 49. When the molded article has cooled a sufficient amount, it can then be removed by separating the mold halves 47 and 48 in any suitable manner such as is well-known to those skilled in the art.

In practical operation, it is preferable to use a sufficient quantity of the loosely granulated thermoplastic molding materials in the mold cavity 14 to provide a pellet 20 which contains a slightly greater volume than is necessary to fill the mold cavity 49. By this means, the molding material is in readiness in the molding cavity 14 by a sufficient amount to always keep the injection chamber or bore 41 suitably ready for injection. Mechanism is provided by means well-known to those skilled in the art whereby the injection plunger 42 fails to execute an injection stroke when the oversized pellets accumulate in the injection bore 41 due to the greater capacity of the pellets than the mold cavity 49 for receiving them.

It will be understood that I desire to comprehend within my invention such modifications as may be embraced within the scope of the invention and the appended claims.

Having thus fully described my invention, what I claim as new and desire to secure by Letters Patent, is:

1. In a method of injection molding materials, compressing a predetermined quantity of loosely granulated thermoplastic molding material to form a solid pellet and enclosing the same in a frangible container, heating the pellet while in said container to a temperature immediately below the deformation temperature of the material, inserting the heated pellet and container in an injector, further heating the enclosed pellet while in the injector to render the material plastic, and injecting the material into a mold.

2. In a method of injection molding materials, compressing a predetermined quantity of thermoplastic material to form a solid pellet and placing it in a frangible container, heating the container enclosed pellet to a temperature immediately below the deformation temperature of the material, inserting the heated pellet retained in the container in an injector chamber having a capacity per injection stroke slightly less than the volume of said container, and injecting the material therefrom into a mold.

3. In a method of injection molding materials, the steps comprising forming an injection molding cartridge by enclosing a predetermined quantity of granulated thermoplastic molding material, compressing the enclosed material to form a pellet, inserting the pellet in a container, applying a closure to the container, and placing the container comprising the preformed pellet of thermoplastic material in an injection chamber and compressing the same while raising its temperature to cause the plastic to be ejected.

4. In a method of injection molding materials, the steps comprising forming an injection molding cartridge by enclosing a predetermined quantity of granulated thermoplastic molding material, compressing the enclosed material to form a pellet while applying heat thereto, inserting the pellet in a container, applying a closure to the container, and placing the container comprising the preformed pellet of thermoplastic material in an injection chamber and compressing the same while raising its temperature to cause the plastic to be ejected.

5. In a method of injection molding materials, the steps comprising forming an injection molding cartridge by enclosing a predetermined quantity of granulated thermoplastic molding material, compressing the enclosed material to form a pellet, inserting a plurality of the pellets in closely packed formation in a container, applying a closure to the container, and placing the container comprising the preformed pellet of thermoplastic material in an injection chamber and compressing the same while raising its temperature to cause the plastic to be ejected.

6. In a method of injection molding materials, the steps comprising forming an injection molding cartridge by enclosing a predetermined quantity of granulated thermoplastic molding material, compressing the enclosed material to form a pellet while applying heat thereto, inserting a plurality of the pellets in closely packed formation in a container, applying a closure to the container, and placing the container comprising the preformed pellet of thermoplastic material in an injection chamber and compressing the same while raising its temperature to cause the plastic to be ejected.

CHARLES D. RYDER.